United States Patent
Katzer (10) Patent No.: US 8,630,801 B2
(45) Date of Patent: Jan. 14, 2014

(54) NAVIGATION DEVICE AND METHOD FOR THE GRAPHIC OUTPUT OF NAVIGATON INSTRUCTIONS

(75) Inventor: Jochen Katzer, Gallmersgarten-Bergtshofen (DE)

(73) Assignee: Garmin Würzburg GmbH (DE)

( * ) Notice: Subject to any disclaimer, the term of this patent is extended or adjusted under 35 U.S.C. 154(b) by 1511 days.

(21) Appl. No.: 12/022,215

(22) Filed: Jan. 30, 2008

(65) Prior Publication Data

US 2008/0208450 A1 Aug. 28, 2008

(30) Foreign Application Priority Data

Feb. 28, 2007 (DE) .......................... 10 2007 010 166
Jun. 29, 2007 (DE) .......................... 10 2007 030 345

(51) Int. Cl.
*G06F 17/00* (2006.01)
*G06F 19/00* (2011.01)
*G08G 1/09* (2006.01)
*G01C 21/34* (2006.01)

(52) U.S. Cl.
USPC ......... 701/431; 701/436; 701/437; 340/995.2

(58) Field of Classification Search
USPC ......... 701/400, 408, 410, 411, 418, 423, 428, 701/431, 436, 437, 439, 445, 454, 457, 459, 701/468, 469, 487, 532, 533; 340/990, 340/995.1, 995.14, 995.18, 995.19, 995.2, 340/995.24, 995.26, 995.27
See application file for complete search history.

(56) References Cited

U.S. PATENT DOCUMENTS

| | | | |
|---|---|---|---|
| 5,739,772 A | 4/1998 | Nanba et al. | |
| 5,874,905 A | 2/1999 | Nanba et al. | |
| 6,018,697 A | 1/2000 | Morimoto et al. | |
| 6,182,010 B1 * | 1/2001 | Berstis | 701/211 |
| 6,356,840 B2 * | 3/2002 | Kusama | 701/211 |
| 6,360,168 B1 | 3/2002 | Shimabara | |
| 2002/0013659 A1 | 1/2002 | Kusama | |
| 2006/0287819 A1 | 12/2006 | Brulle-Drews et al. | |
| 2009/0187335 A1 * | 7/2009 | Muhlfelder et al. | 701/200 |

FOREIGN PATENT DOCUMENTS

| | | |
|---|---|---|
| EP | 1 536 394 A2 | 6/2005 |
| EP | 1 681 538 A1 | 7/2006 |
| JP | 10 030935 A | 2/1998 |

* cited by examiner

*Primary Examiner* — Thomas Tarcza
*Assistant Examiner* — Edward Pipala
(74) *Attorney, Agent, or Firm* — Samuel M. Korte; Mohammad M. Ali (57) ABSTRACT

A system and method for determining and displaying a navigation route on a navigation device from one vehicle position to a travel destination. The navigation device can include processor with RAM, a mass storage device for holding a database with geographic data, as well as a display. Depending on whether a complex intersection is present on the navigation route, the complex intersection can be shown on the display in the form of a single perspective view. Embodiments of the invention can provide a high level of correlation between the actual situation on the road as seen by the user and the corresponding navigation maneuver displayed on the screen. The graphic output of navigation devices for complex intersections can also be improved regardless of whether the navigation device is a high-performance or very simple device.

22 Claims, 5 Drawing Sheets

| Entry | Exit | Situation | Road type | Bridge type | Road No. | Arrow | Mirrored | Sign |
|-------|------|-----------|-----------|-------------|----------|-------|----------|------|
| Link 0 | Link 1 | Environment 3 | Typ 12 | Br.type 8 | A30 | Arrow 12 | no | Sign 421 |
|  | Link 2 |  |  |  | A31 | Arrow 28 |  | Sign 421 |
|  | Link 3 |  |  |  | A3 | Arrow 8 |  | Sign 421 |

0_3_3_12_4_A3_8_0_421.png

Fig. 13

NAVIGATION DEVICE AND METHOD FOR THE GRAPHIC OUTPUT OF NAVIGATON INSTRUCTIONS

CROSS REFERENCE TO RELATED APPLICATION

This application claims the priority benefit of German Patent Application No. 10 2007 010 166.1 filed Feb. 28, 2007 and this application also claims the priority benefit of German Patent Application No. 10 2007 030 345.0 filed on Jun. 29, 2007, the contents of which are hereby incorporated by reference as if set forth in their entirety herein.

STATEMENT REGARDING FEDERALLY SPONSORED RESEARCH OR DEVELOPMENT

Not applicable.

FIELD OF THE INVENTION

The invention relates to a navigation device for determining and displaying a navigation route from one vehicle position to a travel destination and to a method for graphically outputting navigation instructions.

BACKGROUND OF THE INVENTION

When using navigation devices, in particular when using navigation systems while traveling in a motor vehicle, the fundamental problem is that the driver must split his attention between the actual conditions in front of the motor vehicle and the display of navigation instructions on the screen of the navigation device.

However, this problem is most serious precisely in cases where the motor vehicle approaches a comparatively complicated set of maneuvers with which the driver is not yet familiar. In such a situation, the driver is confronted with the dilemma of having to discern and understand the display on the navigation screen, while at the same time keeping an eye on the actual traffic situation and line of the road. In addition, the driver must recognize the correlating features between what is displayed on the navigation screen and the actual situation on the road, thereby associating the graphic navigation instructions to the actual situation so as to follow the right way through the upcoming set of maneuvers.

In other words, this means that especially high requirements are to be placed on the graphic display of navigation devices precisely where complex intersections are to be displayed on the screen in an intuitively discernible way.

Known from prior art in this regard from U.S. Pat. No. 5,739,772 is to output complicated navigation maneuvers, e.g., with several consecutive turns one after the other, as a row of schematic arrows on the screen. However, in this known teaching, complicated navigation maneuvers are presented as a sequence of various symbols or arrows, while the entire navigation maneuver is not logically or graphically summarized in a single display.

In particular, however, such complex intersections are only symbolically depicted according to this teaching known from prior art, often making it difficult for the driver to intuitively recognize the correlation between what is displayed on the navigation screen and the actual situation on the road.

Conventional navigation systems known from prior art generally display complex intersections as consecutive, time-resolved individual maneuvers, so that the overview needed by the user cannot be put together on the display of the navigation device. As an alternative, the complex intersections in standard navigation systems are displayed solely within the framework of a conventional 2-D map or symbol representation. However, this frequently overwhelms the user, since the symbol or map representation does not correlate with his visual perspective. This holds all the more true since driving through a complex intersection demands a very high level of concentration on the road situation, so that the user can only focus very little on interpreting an abstract representation on the screen of the navigation device.

SUMMARY OF THE INVENTION

Against this backdrop, the present invention provides a navigation device and a method for graphically outputting navigation instructions that overcome the mentioned disadvantages and limitations existing in prior art.

In particular, an embodiment of the present invention can allow the user to recognize the display of complex intersections on the screen of a navigation device in an especially easy and intuitive manner. This can provide high level of correlation between the actual situation on the road as seen by the user while approaching a complex intersection and the corresponding navigation maneuver displayed on the screen. This can improve comfort and safety during the use of navigation devices, especially while approaching and traversing complex intersections.

According to an embodiment, the present invention provides a navigation device for determining displaying a navigation route from one vehicle position to a travel destination. The navigation device can include a processor with RAM, a mass storage device for holding a database with geographic data, and a display. Depending on the relative spatial position of at least two consecutive intersecting points in the navigation route, the consecutive intersecting points can be depicted on the display as a single, shared perspective view.

According to another embodiment, the present invention provides a method for the graphic output of navigation instructions using a navigation device programmed for determining and displaying a navigation route from one vehicle position to a travel destination. The navigation device can include a processor with RAM, a mass storage device for holding a geographic database, a display, and navigation software that can be loaded in the RAM or processor. The method can include the steps of checking to see whether a complex intersection is present as part of generating a digital roadmap, generating at least one photographic, videographic or rendered image of the complex intersection, generating a graphic perspective view of the complex intersection based on the at least one image, allocating geographic position information to the perspective view, referencing the perspective view to a digital roadmap at the location of the geographic position information, during the navigation process, using the navigation device to check whether a complex intersection is present, or whether a corresponding perspective view allocated to the upcoming intersection is present, and outputting the perspective view of the complex intersection on the display.

The navigation device according to an embodiment of the present invention can be used to ascertain and display a navigation route, in particular from a vehicle position to a travel destination, and consists of a processor with RAM, a mass storage device for holding a database with geographic data, along with a display. Depending on the relative spatial position of at least two consecutive intersections in the navigation route, the consecutive intersections can be depicted on the display as a single, shared perspective view. This can be advantageous in that complex intersections, e.g., highway intersections, frequently exhibit several consecutive turns that the driver or user of the navigation system might have difficulty seeing, especially if not familiar with the surroundings.

Based on the relative spatial position, e.g., distance, of consecutive intersections or turns, if need be along with other parameters, like expected vehicle speed or road class, an evaluation can be performed to determine whether several sequential turns should be consolidated and displayed in a single, shared representation on the screen of the navigation device. If this is the case, a corresponding perspective view can be generated or retrieved from the mass storage device of the navigation device that contains the turns to be combined into an overview. The viewing angle of the perspective depiction here can correspond to the viewing perspective of the user, i.e., in particular to the perspective of the driver of a motor vehicle. Therefore, the user can intuitively ascertain the entire complex intersection or entire sequence of consecutive turns by glancing at the screen of the navigation device, and hence easily and safely follow the correct route, even given difficult maneuvers in an unknown environment.

When and how the characteristics of an intersection are determined and evaluated can be initially not even relevant with respect to realizing embodiments of the invention. In particular, the relative spatial position of consecutive intersections can be determined and evaluated, and the resultant decision as to whether to generate a uniform, perspective view encompassing several intersections can be made in advance as part of generating a roadmap. In this case, the navigation device can be programmed to call up the perspective view prepared or generated in advance and display it on the screen at a specific time before reaching the corresponding complex intersection. In proceeding in this way, the limited hardware and software resources of the navigation device do not have to be used to generate a highly realistic perspective view, which might potentially involve a high computational outlay, but rather, this can be done with a correspondingly designed computer system at the roadmap provider or navigation system manufacturer and/or a manufacturer of auxiliary data for conventional roadmaps. In this way, very high quality perspective views of the complex intersection can already be generated or prepared by the manufacturer, and filed along with the roadmap in the mass storage of the navigation device. However, alternative embodiments of the invention can also make it possible to program the navigation device itself to determine and evaluate the relative spatial position of at least two intersections or other characteristics of a complex intersection and/or generate the corresponding perspective view of the complex intersection.

Regardless of the device and method used in generating the perspective view, however, another embodiment of the invention can provide that the perspective view be generated based on a photograph or video recording of the actual turn involved. As opposed to completely virtual perspective views, this can ensure that the perspective views output by the navigation device will correspond very precisely with the actual situation. In addition, the required computing power can be reduced in this way compared to the complete virtual rendering of the perspective views.

An alternative embodiment of the invention provides that the perspective view be generated based on a three-dimensional and/or photorealistically rendered recording of the actual turn. Close-to-real or hyper realistic three-dimensional representations or perspective views can be generated even without photographs or video recordings that are already available or must be generated.

In another embodiment of the invention, the perspective view can encompass graphic curves or substantially continuous arrows to highlight the prescribed route. In this way, the route to be followed by the user can be visualized in complete perspective and continuously, even if the route comprises several consecutive turns. This can provide a continuous visualization of the lane to be followed over several successive maneuvers, which can be easier to for a user to follow than separate arrow representations of individual, successive maneuvers.

Another embodiment of the invention provides that the perspective view itself be static and superposed on the screen of the navigation device with a movable graphic element, wherein the graphic element symbolizes the current location of the user or navigation device. Users can thereby easily identify and track their own position and changes therein on the navigation device screen, even during the (temporarily) static display of the perspective view on the screen of the navigation device. In particular, this graphic element can be a positional representation of the vehicle, but also a progress bar that describes the approach to the maneuver.

In another embodiment of the invention, the perspective view on the screen of the navigation device encompasses additional graphic elements, in particular signs, bridges, underpasses, points of interest, icons, building silhouettes, landmarks, or topography of the terrain model based on the actual environment of the turn or the complex intersection. This can provide especially realistic depictions of particularly complex turns, since the user finds the correspondingly highlighted landmark features on both the actual road and on the screen of the navigation device, and hence can draw upon them for purposes of better orientation.

The additional graphic elements can be generated independently of the perspective view and modularly stored. This can save on storage space, and make uniform the other graphic elements, which hence only have to be generated or stored in one or a few standard configurations. Depending on requirements, the separately stored additional graphic elements can then be called up and superposed on the perspective view, either modularly or in the form of a graphic toolbox system.

Depending on the approach to the respective turn, it can also be provided that the displayed additional graphic elements, e.g., signs or bridges, become larger and larger, which only requires a little computing power owing to the perspective view shown as a static background, but still allows the user to visualize the approach to the upcoming complex intersection.

The additional graphic elements also can each exhibit a transparent image background. As a result, the additional graphic elements and perspective view or road silhouette can be easily and seamlessly superposed, regardless of the shape, size or graphic complexity of the additional graphic elements.

Aspects of the present invention further relate to a method for the graphic output of navigation instructions by means of a navigation device programmed to determine and display a navigation route from a vehicle position to a travel destination. The navigation device can include a processor with RAM, a mass storage device for holding a geographic database, a display, and navigation software that can be loaded in the RAM or processor.

The method according to an embodiment of the invention can include the procedural steps outlined below.

To start out with, an evaluation can be performed to check for the existence of a complex intersection in a first procedural step a), in the context of generating a digital roadmap. In particular, this can take place based on the distance between several consecutive individual maneuvers along a navigation route, the expected vehicle speed, the road class, or based on other intersection attributes present in the roadmap.

If the analysis and evaluation in the preceding step yields a positive result, at least one image of the road situation comprising the consecutive intersections can be generated in another procedural step b) based on photographs, videos and/or renderings.

The at least one image generated in the preceding step can then be used to generate a graphic perspective view of the complex intersection.

Geographic position information can then be allocated to the perspective view, and the perspective view can be referenced to a digital roadmap at the location of the geographic position information. In this way, the previously generated perspective view can be linked to a specific geographic position, so that, as the corresponding geographic position is approached, the accompanying perspective view can be called up.

During the navigation process, the navigation device can check whether a complex intersection is coming up, or whether a corresponding perspective view is allocated to an upcoming navigation maneuver or its geographic position. If so, the perspective view can be output on the display of the navigation device.

Complex intersections can be converted into corresponding graphic perspective views based on recordings of the actual road situation or on renderings and then stored within the context of the method according to the invention. The graphic perspective views of complex intersections can be generated based on an evaluation of the relative spatial position of immediately consecutive turns, the actual or expected vehicle speed, the road class and/or other characteristics to classify complex intersections. This evaluation can be used to determine whether a complex intersection or several consecutive turns must be displayed in a single perspective view. If so, a perspective view can be generated that combines the turns or the complex intersection into a single overview.

The method according to an embodiment of the invention can be realized regardless of the criteria used in evaluating an intersection as being a complex intersection. However, in an embodiment, the complex intersection can encompass at least two consecutive turns or intersection points. Situations posing a difficulty to the user, such as those with several consecutive lane changes or turning actions, can be depicted in a uniform and vivid overview, so that the user can compare the actual situation and screen display, and in so doing find his way through the complex intersection in a largely intuitive manner.

In another embodiment of the invention, additional relevant characteristics of the turn or complex intersection can be acquired in the context of the photographic, videographic or rendered imaging products in procedural step b). This can include the respective number of lanes, any right/left traffic, signs and their inscriptions, geometric properties of the driving lanes, surrounding landmarks and/or overpasses or underpasses, in particular bridges. In this way, the three-dimensional or perspective view of the complex intersection can be made especially realistic, by incorporating additional relevant characteristics into the perspective view while generating the perspective view. This can help to ensure that the user will rapidly and intuitively recognize and reconcile the perspective view with the actual road situation, and can help to further decrease the risk of distraction by complicated depictions on the navigation screen.

A method according to an embodiment of the invention can further be realized regardless of where, when and how the perspective view of the complex intersection is generated, as long as the perspective view can be geographically allocated to the complex intersection, so that the perspective view can be called up and displayed in time while driving the route.

In a further embodiment of the invention, the perspective view can be rendered on a separate system in advance of the actual graphic output of the navigation device and is stored in the database of the navigation device. In particular, this can economize on the processor capacity of the navigation device, since the already prefabricated, stored perspective views can be accessed as needed. Hence, the stored perspective view need only be called up in time while driving the route, and displayed on the screen of the navigation device. This can allow simple or lesser-cost navigation systems to easily output high-quality or photorealistic perspective views of complex intersections.

An alternative embodiment of the invention provides that the perspective view be generated during the course of the navigation or graphic rendering. In other words, the perspective view can be generated by the navigation device itself based on data or graphic modules stored in the database of the navigation device.

Regardless of whether the perspective view is generated in advance on a separate system, e.g., of the navigation supplier, or by the navigation device itself during navigation, another embodiment of the invention provides that the perspective view be generated modularly by assembling individual graphic elements. The individual graphic elements here can encompass in particular the road geometry, bridges, underpasses, signs, points of interest, icons, building silhouettes and/or topographical landmarks. This first can help to economize on storage space and computing power, and the other graphic elements can be made largely uniform. In addition, the additional graphic elements can hence each be generated or stored in only a few standard configurations, after which they can be combined into a kind of graphic module toolbox, so as to generate the perspective view in this way.

Here the entire perspective view can be generated modularly using individual building blocks, or, if required, only specific elements, such as signs and directional arrows, can be superposed over the finished, stored perspective views which additionally include the background, road geometry and bridges/underpasses.

Specific displayed elements, e.g., signs or bridges, can become larger and larger while approaching the respective maneuver, but without having to change the perspective view or the depiction of road geometry itself. This can make it possible to easily visualize the approach to the maneuver without having to constantly recompute the entire screen contents.

The individual graphic elements here can exhibit a transparent image background, making it possible to easily and seamlessly superpose the individual graphic elements, regardless of their shape, size and graphic complexity, to produce the complete perspective view.

In another embodiment of the invention, the individual graphic elements cam be provided with changeable display formats. These display formats, also referred to as "skins", relating in particular to the respectively used colors, fill patterns, textures, line widths, type fonts/colors and sizes, can be comprehensively adjusted or altered. As a result, each individual graphic element, and hence also the finished perspective view, can correspond to the respectively selected display format without the high outlay of having to separately render the graphic elements. This can yield an easy way to adjust the appearance of the overall graphic to the respective specific basic conditions, such as day/night display, customer preferences and the like.

In another embodiment of the invention, at least one sign can be generated as an individual graphic element from a stored text while following the route or rendering the perspective view. This can minimize the storage space required for a simultaneously realistic, graphic depiction of road signs with substantially any text content. In other words, the signs to be displayed may not be stored in the form of graphic files, but rather, only features of the signs, such as the sign text in particular, but also other features, including in particular sign size, symbols, colors, etc. displayed on the signs, can be stored in the form of descriptive files or text files. The actual sign graphic can then be generated form the stored attributes as needed.

A certain scope of signs encountered especially frequently can be stored as a finished, pre-generated graphic, wherein other signs to be displayed additionally in the absence of a pre-generated graphic can then be generated and rendered from the corresponding descriptive files. Both the graphic and text-based generation and/or depiction of signs can be provided in parallel.

In another embodiment of the invention, only the sign pointing to a lane or turn to be followed by the user can be displayed. This can help give the user a better and easier overview of the screen display, since the signs not relevant for the route can be masked out. As an alternative, all signs present in the actual road situation can be displayed, wherein the sign pointing to the lane or turn to be followed can be highlighted relative to the other present, but currently less relevant signs. This can help achieve an even better correlation between the overall situation displayed on the screen of the navigation device and the actual situation on the road, without impairing the clarity of the perspective view with respect to the route to be followed.

In another embodiment of the invention, at least one continuous graphic curve or at least one continuous arrow can be superposed onto the perspective view in compliance with the navigation route selected or to be followed. In this way, the user can continually visualize the route to be followed in perspective, even if it consists of several consecutive turns. The perspective view can be superposed by the arrow corresponding to the selected route in the navigation system. Several curves or arrows can be stored or displayed for one and the same combination of entries and exits for the complex intersection, provided there are several permissible paths from the entry to the exit of the complex intersection.

The actually selected lane can be used to select between several present graphic curves or several arrows to be followed while entering the complex intersection. However, all present route guide arrows that correspond to the route to be followed can optionally be displayed simultaneously, showing the precise lane. This means that a separate arrow can be displayed for each lane that matches the route to be followed, while the route guide arrows for those lanes that do not reflect the current maneuver are masked out. In this way, the user can immediately discern whether there are several lanes available to choose from without exiting the current maneuver or the route. In addition, the user can immediately get a direct overview of whether he is on one of the potentially several permissible lanes, which can be associated with a correspondingly increased level of safety for the user.

In another embodiment of the invention, the perspective view can be substantially static, but superposed by a moveable graphic element. The movable graphic element can symbolize the current location of the user or the navigation device. In this way, the user can better recognize his or her own position and changes therein on the navigation screen not just during normal navigation, but also for the temporary period for which an substantially static perspective view is displayed.

In another embodiment of the invention, the relevant characteristics of the complex intersection can be encoded in the file name of the perspective view. Hence, the perspective view respectively required in relation to a specific complex intersection can be clearly accessed at all times, regardless of whether the perspective view has already been fully generated and stored in the memory of the navigation device, or is compiled or rendered during the navigation process using individual graphic elements. In other words, a perspective view belonging to a complex intersection can either be called up directly just by referencing the corresponding file name (if the finished graphic is already present in the mass storage of the navigation device), or the generation of the corresponding perspective view can be initiated, also be just calling up the file name (if no corresponding finished graphic is present).

The invention will be described in greater detail below based on drawings, which only represent exemplary embodiments.

DETAILED DESCRIPTION OF THE EXAMPLE EMBODIMENTS

Figure 1:
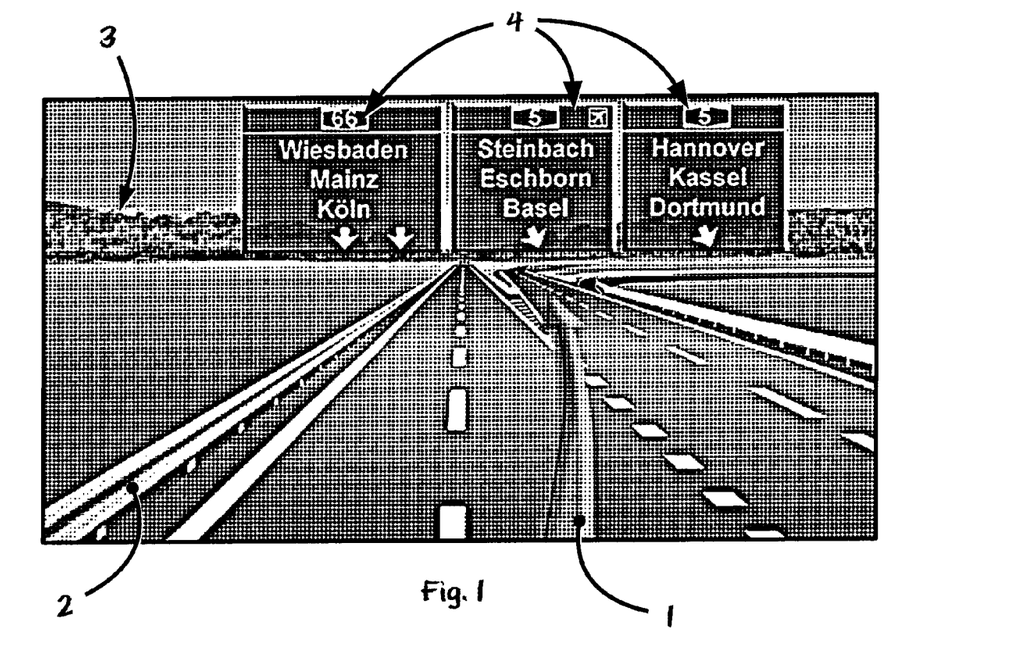
FIG. 1 is a schematic depiction of an example for a perspective view of a complex intersection generated using a navigation device according to an embodiment of the invention or a method according to an embodiment of the invention.

FIG. 1 shows a schematic view of an example for a perspective view of a complex intersection depicted or generated using the navigation device according to the invention or the method according to the invention. As evident, the depicted maneuver encompasses two consecutive navigation maneuvers. The first maneuver involves changing lanes from highway A66 to highway A5, while the first lane change initially comprises both successive traveling directions of the A5. This is followed immediately by another turn scenario, specifically the decision as to the direction in which to travel down the A5. In the present navigation route, the A5 is to be taken in the traveling direction of Steinbach, Eschborn, Basel. Therefore, the complicated intersection according to FIG. 1 requires a first navigation instruction to exit the A66 onto the initially still common entry point to both traveling directions of the A5, followed right away by another navigation instruction to remain on one of the two straight lanes continuing in the direction of A5 Steinbach, Eschborn, Basel.

The perspective view according to FIG. 1 graphically combines both navigation instructions into a single perspective view, and superposes a directional arrow 1 that also encompasses both navigation maneuvers over the depiction of the entire complex intersection. In this way, the driver can recognize the entire upcoming situation at a glance, and intuitively immediately select the correct lane through the entire complex intersection.

First of all, the ability to intuitively recognize the situation is supported by the fact that the perspective view according to FIG. 1 roughly matches the actual viewing level of the driver, so that the same perspective angles and vanishing points as for the actual road situation appear on the navigation screen.

In addition, the perspective view according to FIG. 1 encompasses a series of landmarks that are also encountered in the accompanying actual road situation. This includes in particular the highlighted guardrails 2, the background or horizon 3 symbolizing the surrounding countryside, as well as the graphically depicted highway signs 4 that match the actual exit signs.

Taken together, these features in the perspective view yield a high level of correlation between the actual situation on the road and what is depicted on the screen of the navigation device, wherein the only significant difference between the actual situation and the screen display involves the additionally present arrow representation 1 for visualizing the lane to be followed.

Figure 2:
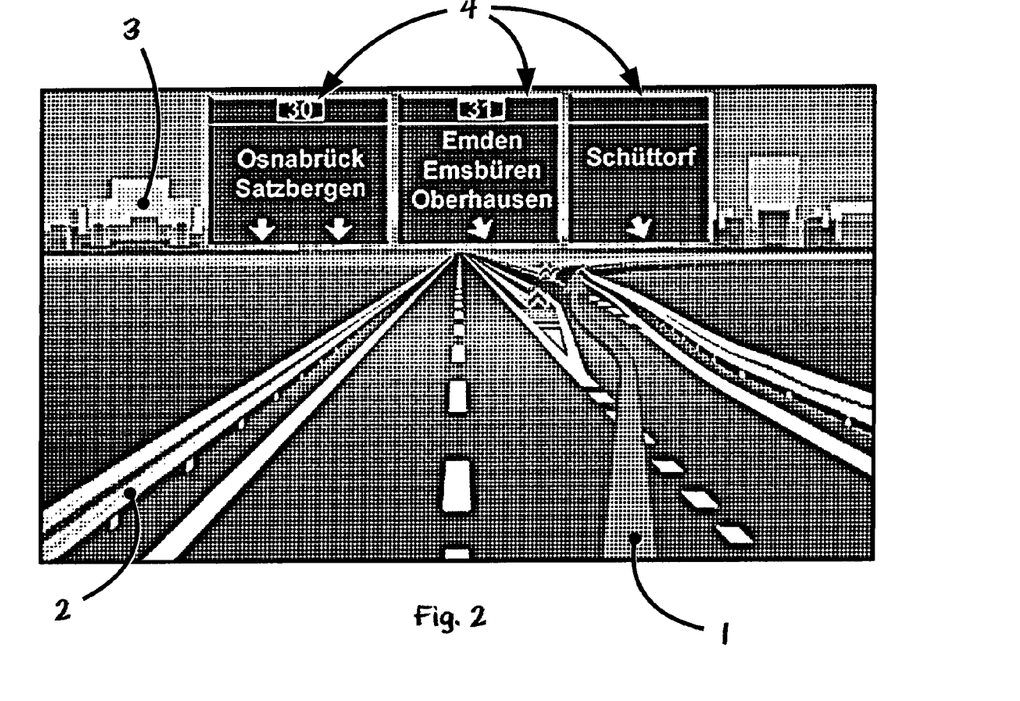
FIG. 2 is a depiction corresponding to FIG. 1 of another example for a perspective view of a complex intersection.

FIG. 2 shows an intersection similar to FIG. 1, the difference being that FIG. 2 is based on a navigation route where the additional exit that immediately follows the first exit from the highway must be followed. The interplay between the perspective view encompassing the entire maneuver and the superposed directional arrow 1 here again allow the driver to recognize the lane to be followed through the complex intersection at one glance. As opposed to FIG. 1, the depiction on FIG. 2 utilized a background 3 showing an urban environment that matches the corresponding actual highway exit according to FIG. 2.

Figure 3:
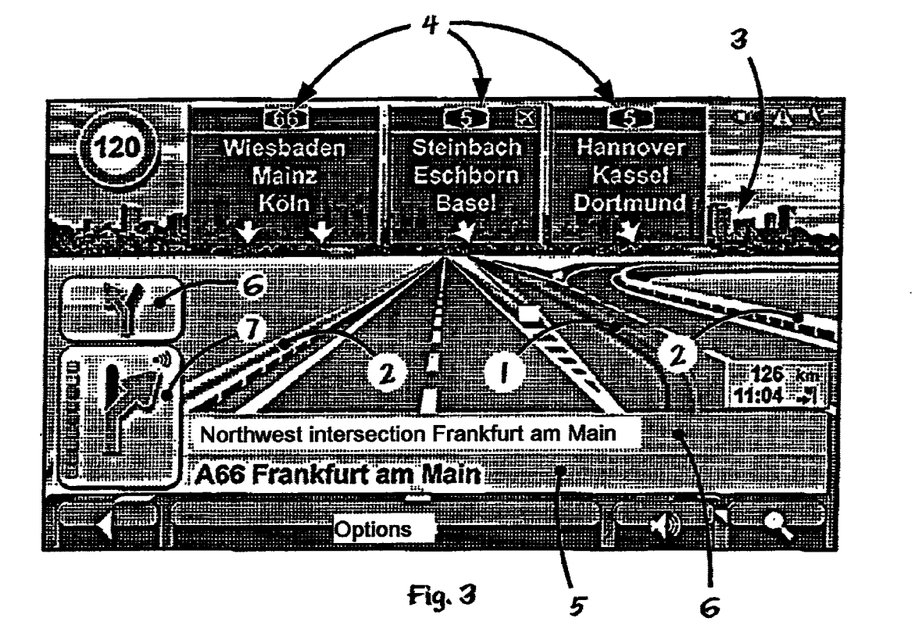
FIG. 3 is a depiction corresponding to FIGS. 1 and 2 of another example for a perspective view of a complex intersection.

The complex intersection shown in FIG. 3 corresponds to the intersection according to FIG. 1. As opposed to FIGS. 1 and 2, the depiction according to FIG. 3 also incorporates some additional information relating in particular to the currently traversed route 5 and designation of the currently reached turn 6. The screen display according to FIG. 3 further includes an additional schematic view of the two upcoming, successive turn maneuvers 7 (with approach bar) and 8. FIG. 3 also clearly illustrates the form in which the signs are displayed. The depicted traffic signs 4 are rendered in a highly realistic manner on the one hand, but shown semitransparently on the other, so that the user can ascertain both the texts on the traffic signs 4 while at the same time still discerning the image background.

Figure 4:
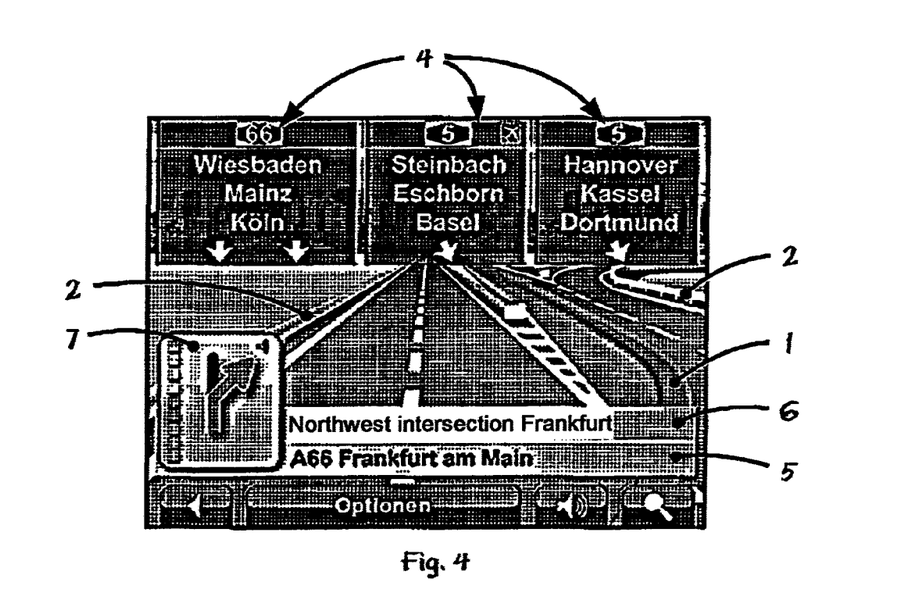
FIG. 4 is a depiction corresponding to FIGS. 1 to 3 of another example for a perspective view of a complex intersection on a smaller navigation screen.

The complex intersection shown in FIG. 4 largely corresponds to the perspective view depicted in FIG. 4. The difference between the perspective view according to FIG. 4 and the perspective view according to FIG. 3 lies solely in the fact that the perspective view according to FIG. 4 was rendered for a smaller navigation screen. For this reason, several graphic elements are shown on a smaller scale or omitted entirely in the perspective view of FIG. 4, so as to still provide the user with an overview of the route 1 to be followed through the complex intersection.

Figure 5:
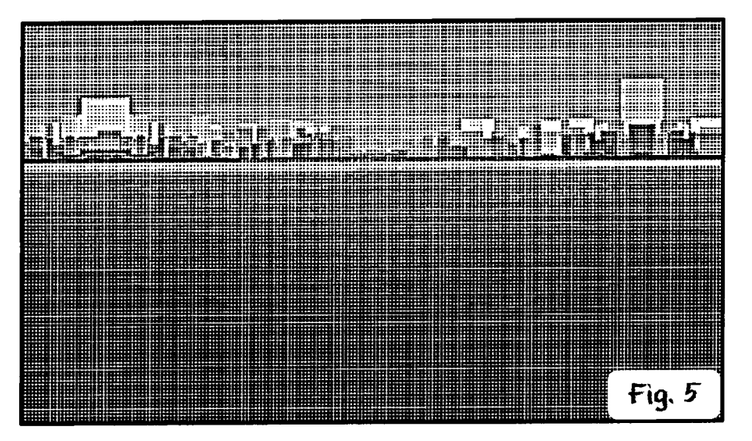
FIG. 5 is a schematic depiction of a background graphics module as a graphic element for generating a perspective view of a complex intersection.
Figure 6:
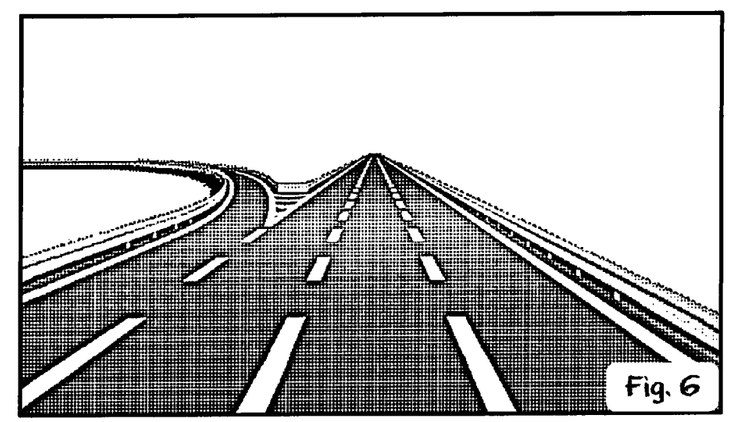
FIG. 6 is a depiction corresponding to FIG. 5 of a road geometry graphics module for generating a perspective view of a complex intersection.
Figure 7:
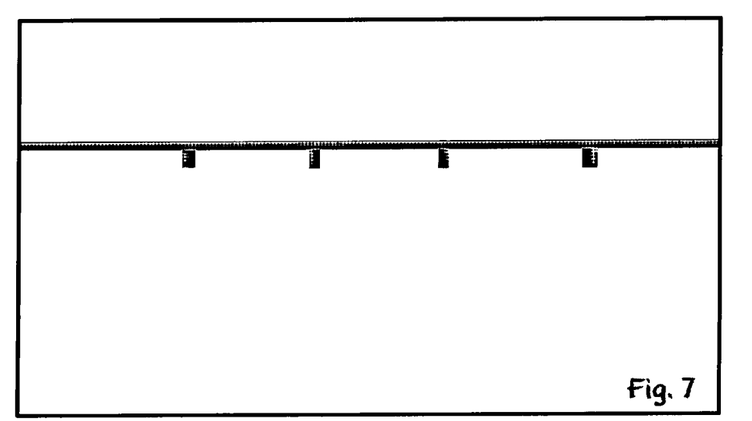
FIG. 7 is a depiction corresponding to FIGS. 5 and 6 of a bridge graphics module for generating a perspective view of a complex intersection.
Figure 8:
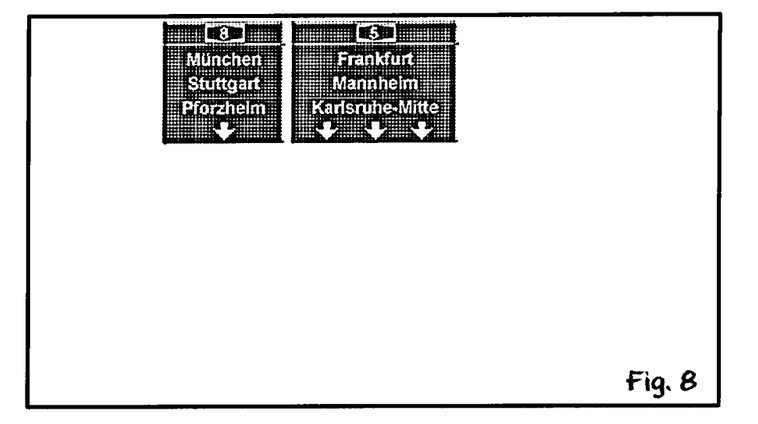
FIG. 8 is a depiction corresponding to FIGS. 5 to 7 of a sign graphics module for generating a perspective view of a complex intersection.
Figure 9:
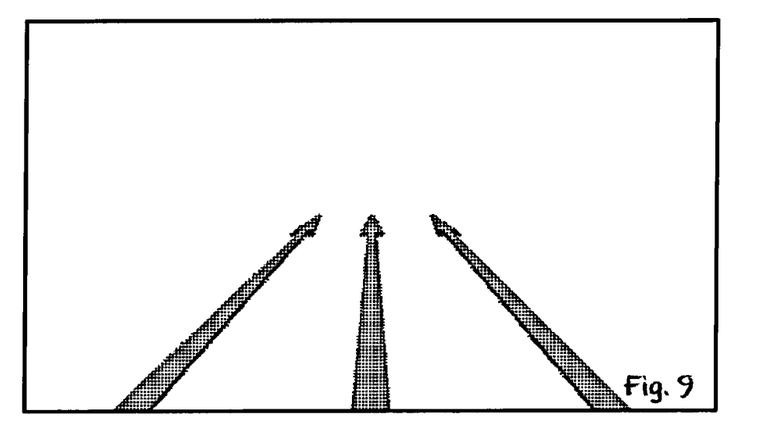
FIG. 9 is a depiction corresponding to FIGS. 5 to 8 of a directional arrow graphics module for generating a perspective view of a complex intersection.
Figure 10:
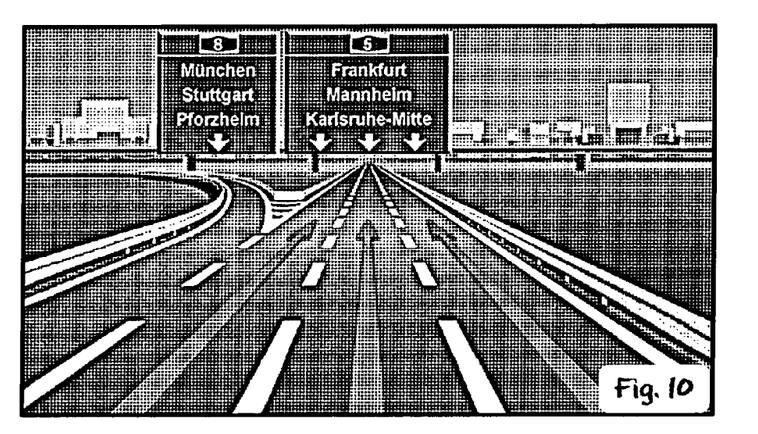
FIG. 10 is a depiction corresponding to FIGS. 5 to 9 of the perspective view generated using the graphics modules according to FIGS. 4 to 8.

FIGS. 5 to 10 illustrate how the perspective view is put together modularly out of separately generated or stored graphic modules in one embodiment of the present invention. In this case, FIG. 5 shows the urban background or horizon reflecting the environment in proximity to a city, FIG. 6 shows the road geometry reflecting the current complex intersection, FIG. 7 shows a road bridge present for the current intersection, FIG. 8 shows the highway signs also associated with the current intersection, FIG. 9 shows the route guide arrows that correlate precisely to the lanes in the current navigation route within the context of the current intersection, and FIG. 10 finally shows the perspective view formed by superposing the individual graphic elements of FIGS. 5 to 9. To ensure that the graphic modules will be easily and seamlessly superposed even at a low available graphic computing power, the graphic modules according to FIGS. 6 to 9 that do not fill the screen are excluded and provided with a transparent background, e.g., in the PNG graphics format.

Figure 11:
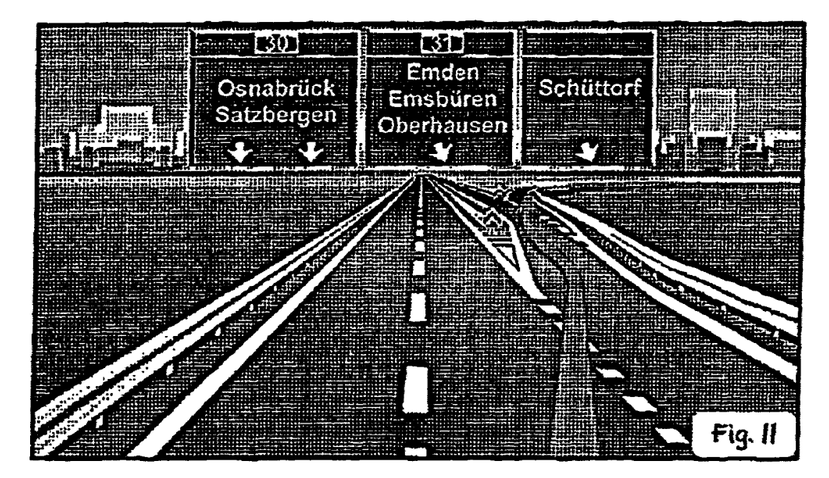
FIG. 11 is a depiction corresponding to FIGS. 5 to 10 once again of the maneuvering situation according to FIG. 2.
Figure 12:
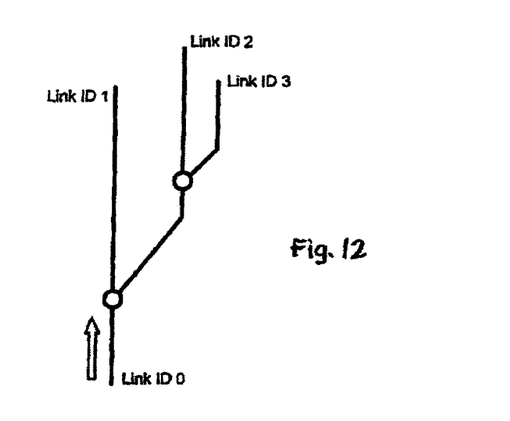
FIG. 12 is a schematic top view of the distribution tree of a roadmap belonging to the maneuvering situation according to FIG. 11.
Figure 13:
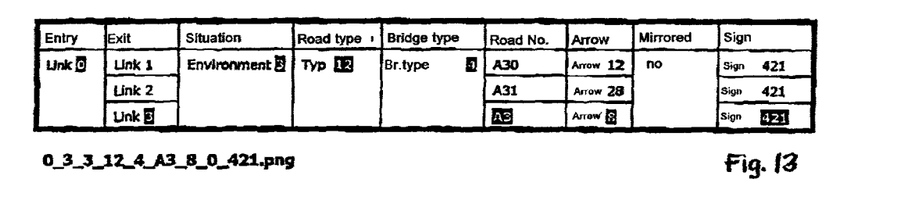
FIG. 13 is a property table of the perspective view belonging to the maneuvering situation according to FIGS. 11 and 12 to define the file name for the perspective view.

An overall view of FIGS. 11 to 13 illustrates the correlation between the relevant characteristics of a complete intersection (FIG. 11, see also FIG. 2) and the accompanying distribution tree of the roadmap according to FIG. 12 and the composition of the file name according to FIG. 13 to identify the accompanying perspective view according to FIG. 11.

As evident from FIG. 11 (which corresponds to FIG. 2), two lane changes in succession must be executed to arrive at the "Schüttorf" exit contained in the navigation route present here from highway A31. On the roadmap according to FIG. 12, this corresponds to the entry into the complex intersection at the point marked "Link ID 0" and the exit from the complex intersection at the point marked "Link ID 3".

In order to reference the perspective view according to FIG. 11 associated with this drive through the complex intersection, a specific file name is generated according to the table of FIG. 13. The file name "0_3_3_12_4_A3_8_0_421.png" given once again under the table of FIG. 13 here contains all features necessary for describing the complex intersection, in particular the selection values highlighted in the table, which match the route through the complex intersection present here.

In other words, the complete graphic route guide or perspective view according to FIG. 11 can be displayed on screen merely by calling up the file name "0_3_3_12_4_A3_8_0_421.png". In particular, this is independent of whether the perspective view according to FIG. 11 has already been pre-generated and stored in the mass storage device of the navigation device, or whether the perspective view according to FIG. 11 is only rendered while running the navigation program or put together out of individually stored graphic modules. In each case, just the file name "0_3_3_12_4_A3_8_0_421.png" is sufficient for displaying the graphic according to FIG. 11 on the screen of the navigation device.

As a consequence, embodiments of the invention yield a navigation device and a method for the graphic output of navigation instructions that provide the user with a simple, quick and especially intuitive overview of complex intersections on the screen of a navigation device.

Embodiments of the invention can make it possible to achieve a high degree of correlation between what the user can actually see out on the open road and the corresponding navigation maneuver as displayed on the screen, largely independently of whether it is a high-performance or very simple navigation device. As a result, the graphic output of navigation devices can be improved for complex intersections, so that potential hardware costs can be cut at the same time. When used in motor vehicles, the improved guidance of the driver through complicated maneuvers can improve safety.

Hence, in the area of navigation devices, embodiments of the present invention can make a fundamental contribution on the user side to improving the user friendliness and traffic safety, but can also be used by the manufacturer to improve cost efficiency.

The invention claimed is:

1. A navigation device for determining and displaying a navigation route from one vehicle position to a travel destination, the device comprising:
    a processor with RAM;
    a mass storage device for holding-a database with geographic data; and
    a display;
    wherein the navigation device is programmed to evaluate and determine whether a distance between the relative spatial positions of at least two consecutive navigation maneuvers in the navigation route form a complex intersection, and if the at least two consecutive navigation maneuvers form a complex intersection, the complex intersection and the navigation route through the complex intersection are presented-on the display as a single, shared graphic perspective view.

2. The navigation device according to claim 1, wherein the navigation device is programmed to generate the perspective view.

3. The navigation device according to claim 1, wherein the perspective view is generated based on at least one photograph or video recording of the actual navigation maneuvers.

4. The navigation device according to claim 1, wherein the perspective view is generated based on at least one three-dimensional and/or photorealistically rendered recording of the actual navigation maneuvers.

5. The navigation device according claim 1, wherein the perspective view comprises at least one continuous arrow to symbolize the prescribed navigation route and associated navigation maneuvers.

6. The navigation device according to claim 1, wherein the perspective view is static, and superposed by a movable or variable graphic element, the graphic element symbolizing the current location of the navigation device.

7. The navigation device according to claim 1, wherein the perspective view encompasses additional graphic elements, in particular signs, bridges, underpasses, points of interest, icons, building silhouettes, landmarks, or topography features based on the actual environment associated with a navigation maneuver.

8. The navigation device according to claim 7, wherein the additional graphic elements are generated and stored independently of the perspective view.

9. The navigation device according to claim 7, wherein the additional graphic elements exhibit a transparent image background.

10. A method for the graphic output of navigation instructions using a navigation device programmed for determining and displaying a navigation route including navigation maneuvers to travel from one vehicle position to a travel destination, the navigation device comprising a processor with RAM, a mass storage device for holding a geographic database, a display, and navigation software that can be loaded in the RAM or processor, the method comprising:
    a) checking, using the processor, to see whether a complex intersection is present as part of generating a digital roadmap;
    b) determining, using the processor, whether a complex intersection is present based on a distance between the relative spatial positions of at least two consecutive navigation maneuvers in the navigation route;
    c) given a positive result of the determining performed in procedural step b), generating, using the processor, at least one photographic, videographic or rendered image of the complex intersection based on at least one image;
    d) allocating, using the processor, geographic position information associated with the complex intersection to a perspective view;
    e) referencing, using the processor, the perspective view to a digital roadmap at the location of the geographic position information; and
    f) outputting, using the processor, the perspective view of the complex intersection and the navigation route through the complex intersection on the display.

11. The method according to claim 10, wherein relevant characteristics of the actual complex intersection are included as part of the photographic, videographic or rendered image generation in procedural step c), in particular the number of lanes, right/left traffic, sign inscriptions, geometric properties of the driving lanes or overpasses/underpasses.

12. The method according to claim 11, wherein in procedural step f), at least one sign is generated from a text file as an individual graphic element during route guidance or while rendering the perspective view.

13. The method according to claim 11, wherein in procedural step f), only the instructional sign associated with a lane or turn of a navigation maneuver is displayed.

14. The method according to claim 10, wherein the perspective view in advance of the graphic output on the display is rendered on a separate system and stored in the database of the navigation device.

15. The method according to claim 10, wherein the perspective view in procedural step f) is generated with graphic rendering in process.

16. The method according to claim 10, wherein the perspective view is generated modularly by assembling individual graphic elements, wherein the individual graphic elements encompass in particular the road geometry, bridges, underpasses, signs, points of interest, icons, building silhouettes, or topographical landmarks.

17. The method according to claim 16, wherein the individual graphic elements exhibit a transparent image background.

18. The method according to claim 16, wherein the individual graphic elements are provided with exchangeable display formats.

19. The method according to claim 10, wherein the perspective view in procedural step f) is superposed with at least one continuous arrow showing the selected navigation route through the complex intersection.

20. The method according to claim 19, wherein the graphic curves or arrows are superposed onto the perspective view precisely to the lanes given several lanes that match the navigation route.

21. The method according to claim 10, wherein the perspective view is static and superposed with a movable or variable graphic element, wherein the graphic element symbolizes the current location of the navigation device.

22. The method according to claim 10, wherein the characteristics of the complex intersection are encoded in the file name of the perspective view.

\* \* \* \* \*